United States Patent [19]

Johansson

[11] Patent Number: 4,615,921
[45] Date of Patent: Oct. 7, 1986

[54] THERMAL/OPTICAL CAMOUFLAGE WITH CONTROLLED HEAT EMISSION

[75] Inventor: Lars E. Johansson, Ottawa, Canada

[73] Assignee: Diab-Barracuda AB, Laholm, Sweden

[21] Appl. No.: 771,493

[22] Filed: Aug. 30, 1985

Related U.S. Application Data

[63] Continuation-in-part of Ser. No. 592,237, Mar. 22, 1984, Pat. No. 4,560,595.

[30] Foreign Application Priority Data

Mar. 25, 1983 [SE] Sweden ................ 8301666

[51] Int. Cl.$^4$ .............................. F41H 3/00
[52] U.S. Cl. ............................ 428/17; 428/461; 428/919
[58] Field of Search .......... 428/17, 461, 919; 156/61, 268

[56] References Cited

U.S. PATENT DOCUMENTS

| | | | |
|---|---|---|---|
| 2,936,814 | 5/1960 | Yakubic | 428/206 X |
| 3,069,796 | 12/1962 | Ruter | 428/919 X |
| 3,310,619 | 3/1967 | Slosberg | 428/143 X |
| 4,529,633 | 7/1985 | Karlsson | 428/17 |

*Primary Examiner*—Henry F. Epstein
*Attorney, Agent, or Firm*—Lee, Smith & Zickert

[57] ABSTRACT

The thermal emission characteristics of a camouflage material are predetermined to match closely the known thermal emission characteristics of the natural environment in which the particular camouflage material is intended to be used. This control is accomplished by the combination of a reflecting thin metallic layer covered on at least the exposed side by a layer of plastic comprising at least two different plastic materials each having respectively different emissivity properties. The reflecting layer both minimizes the heating of the camouflage material from sources covered by the material and reflects incident heat from meteorological sources such as solar warming. The plastic layer controls and determines the radiation of heat from all parts of the exposed surface of the camouflage in order to present to surveillance equipment a thermal-picture closely simulating that of the surrounding terrain.

23 Claims, 9 Drawing Figures

FIG. 5
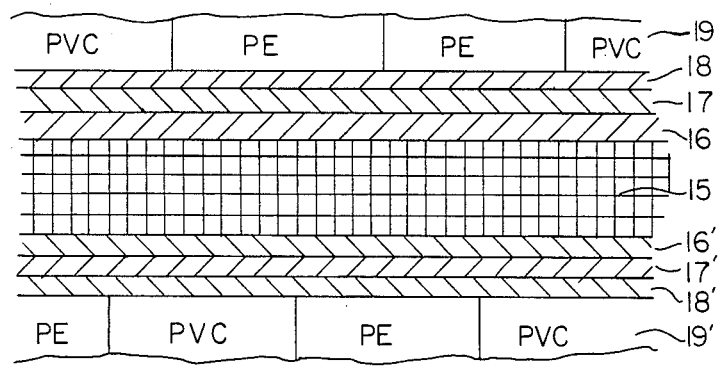
FIG. 6
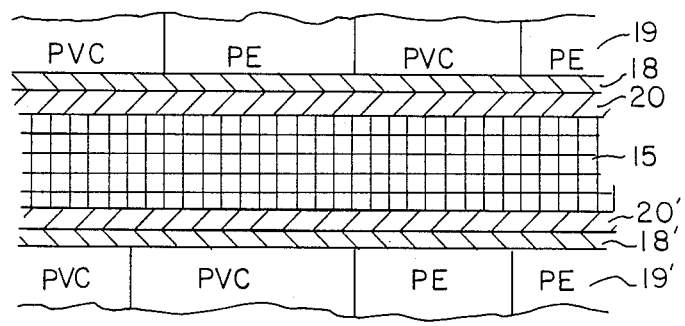
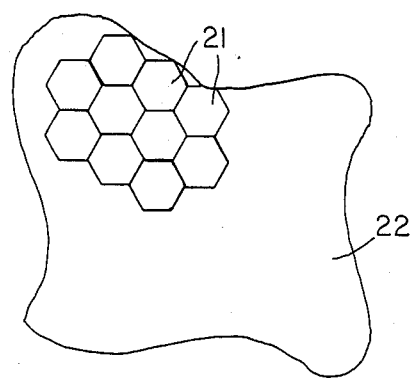
FIG. 7
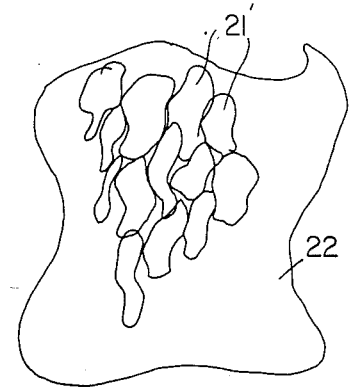
FIG. 8

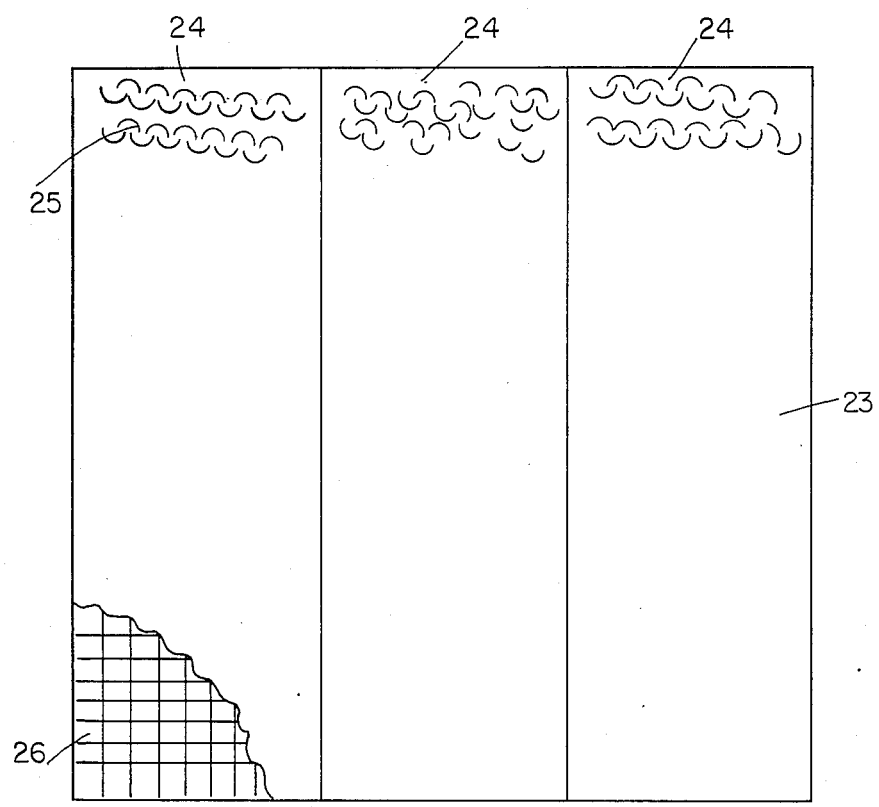

THERMAL/OPTICAL CAMOUFLAGE WITH CONTROLLED HEAT EMISSION

RELATED APPLICATION

This application is a continuation-in-part of co-pending U.S. patent application Ser. No. 592,237, filed Mar. 22, 1984, now U.S. Pat. No. 4,560,595.

BACKGROUND OF THE INVENTION

This invention relates to a thermal and optical camouflage which is provided with a camouflage-colored surface and which provides means for controlling heat emission by creating thermal emission patterns similar to that of the locale in which the camouflage material is deployed.

Leaf-cut camouflage material provided with slits as described, for example, in U.S. Pat. No. 3,069,796, has long been in use as an ultraviolet, visual and near infrared (hereafter termed "near IR") camouflage. It is usually fixed to a supporting net. Camouflage nets are commonly garnished with identically-sized pieces of material which are stretched into hexagons being about 40 cm across and laid side by side, and which are glued to the supporting net. Other designs include more irregular and variously colored figures which are fastened to the net by means of clamps, sewing and the like. The garnishing material is often of matte-surfaced polyvinyl chloride film.

These camouflage nets function very well as far as ultraviolet, visual and near IR camouflage is concerned because the outlines of covered objects are disguised and a picture is obtained which differs very little from the natural environment, provided that the color scheme and the near IR reflection adequately harmonizes with what exists in the environment in which the nets are to be used. Thus, special nets are manufactured for woodland natural environments, for desert natural environments, and for snow natural environments, all of which have considerably different color schemes.

Hoever, these camouflage nets do not provide camouflage protection adequately against reconnaissance with instruments having detectors for thermal infrared radiation in the thermal ranges of 3 to 5 microns and 8 to 14 microns. For such radiation, known camouflage nets are deficient since they appear as surfaces having an even temperature and therefore emit thermal infrared radiation determined entirely by their temperature. This in turn is greatly determined by the temperature of objects being camouflaged and meteorological conditions, such as solar heating.

SUMMARY OF THE INVENTION

The present invention provides a broad-band camouflage material providing camouflage properties in the 3 to 5 micron and 8 to 14 micron thermal infrared wavelength ranges, and which in the UV-visible and photographic IR-wavelength ranges has camouflage properties equal to known camouflages. The invention includes a camouflage material comprising a reflecting metal layer and a continuous layer of plastic overlying the metal layer, the layer of plastic comprising at least two different plastic materials exhibiting different emissivities and transparencies, the plastic materials being situated in a side-by-side relationship with plastic materials of differing emissivities and transparencies adjacent one another such that a mosaic of diverse emissivities is created. The layer of plastic includes in part colored plastics of polyethylene, polypropylene, or other polymers which are highly transparent to thermal infrared waves, and therefore amenable, together with an underlying metal reflecting layer, to controllable emissivity. Other portions of the layer of plastic include colored plastics of polyvinyl chloride, polyurethane or other polymers which are largely opaque to thermal infrared waves.

The reflecting metal layer in the camouflage material produces the result that the side of the camouflage which is visible from the exterior with respect to radiation will be of greater similarity to the natural environment. Because the exposed surface of the camouflage material contains polyethylene or other partially or generally thermal infrared-transparent polymers, temperature contrasts are also created over the exposed surface of the camouflage material because plastic such as polyethylene together with the underlying low emissivity metal surface can present a particularly low thermal emission factor. In an infrared picture, these portions of the camouflage will appear colder than they actually are, and therefore a thermal picture will exhibit a varied thermal pattern even though the actual temperature of the camouflage is uniform. Thus, portions of the surface of the camouflage are polyethylene and other portions are of other plastic materials, such as polyvinyl chloride, which different portions exhibit different emissivities. Polypropylene and other plastic materials, for example, butyl rubber, have thermal transmission properties similar to those of polyethylene.

The plastic materials may be suitably colored with, from the thermal point of view, low-absorbing camouflage pigments. Several different camouflage pigments may be chosen in order to produce a varied surface color configuration. The exterior surface of the camouflage is preferably delustered in a matte fashion in order to reduce specular reflectivity.

The camouflage material is also useful as a thermal camouflage even if camouflaged objects have temperatures higher than that of the ambient environment. To assure proper heat protection, hot objects should be specially insulated by blankets or mats so as to be undetectible, and hot engines, generators, etc. should be provided with temperature screening and preferably air cooled, with heated cooling air being carried off in a suitable manner to prevent the camouflage or other exposed objects from being warmed by the heated air. Hot air is not visible in infrared pictures unless it has been allowed to warm opaque objects, since air has low emissivity.

One purpose of the invention is to create an emissivity pattern which matches the ambient surroundings. This result is accomplished by including the underlying reflecting metal layer in the camouflage material. This layer may be in the form of a mosiac of electrically unconnected areas in order to also control radar reflection.

In accordance with one embodiment of the invention, the camouflage material of the invention comprises, in sheet form, a reflecting metal layer and a continuous layer of plastic overlying the metal layer. The layer of plastic comprises at least two different plastic materials which in combination with the underlying metallic layer have different emissivity and transparency characteristics, with the plastic materials being situated side-by-side with plastic materials of differing emissivities and transparencies adjacent one another such that a mosaic of diverse emissivities is created. In this embodiment of the invention, a support layer may underlie the metal layer with the support comprising a non-woven or woven synthetic fiber web, or a reinforced material, with the metal layer being adhered to the support layer.

The metal layer may comprise a thin layer of metal which is crackled in order to provide a high surface resistivity, and which is glued to the support. Alternatively, the metal layer may comprise a metalized glue film which is glued directly to the support.

In order to assure adhesion of some plastic materials to the metal layer, a primer may be interposed between the plastic layer and the metal layer. The primer is for adhesion purposes only, and contributes no appreciable camouflage properties to the camouflage material.

In accordance with another embodiment of the invention, the camouflage material comprises a plurality of camouflage segments which are secured to a supporting net. Typically, the camouflage segments are cut from a sheet of camouflage material prepared according to the invention, with the metal layer of each segment being secured to a support.

BRIEF DESCRIPTION OF THE DRAWINGS

The invention is described in greater detail below with reference to the drawings, in which:

FIGS. 5 and 6 illustrate other alternative embodiments of the invention, FIG. 7 illustrates a camouflage material made of regular segments which are secured to a net, FIG. 8 illustrates a camouflage material composed of irregular segments which are secured to a net, and FIG. 9 illustrates a camouflage material composed of garnishment panels sewn together and secured to a net.

DESCRIPTION OF EXAMPLES EMBODYING THE BEST MODE OF THE INVENTION

Figure 1:
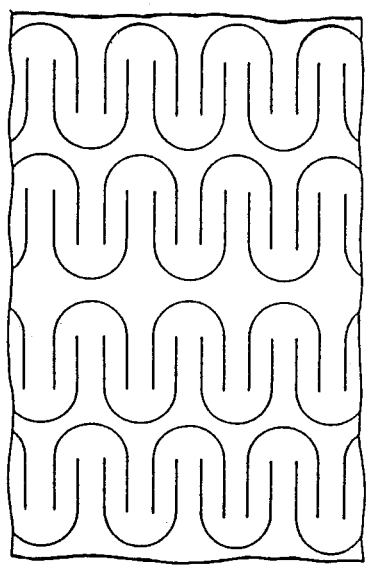
FIGS. 1 and 2 show a conventional leaf-cut camouflage material.
Figure 2:
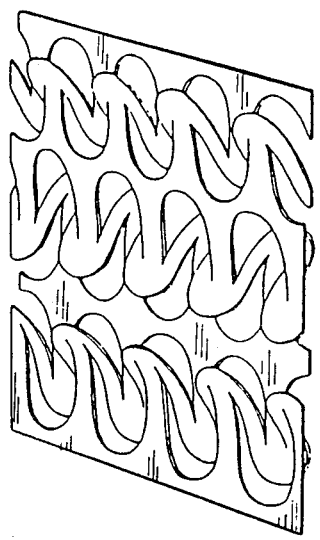

As is seen from FIGS. 1 and 2, a camouflage material may be incised as in FIG. 1, in a so-called leaf-cut fashion, and then may be drawn out into a three-dimensional structure wherein each leaf will be partly turned up and back. In FIG. 2 the stretching process has only begun, it being understood that the parts pointing outwardly will soon turn, and, when the stretching has exceeded a certain limit, that the structure shown in FIG. 1 cannot be obtained again merely by refolding the camouflage.

Figure 3:
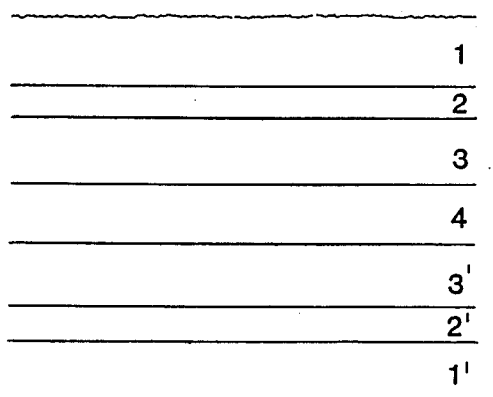
FIG. 3 shows in exaggerated cross section a camouflage material according to one embodiment of the invention.

The camouflage material incorporates a reflecting metal layer covered on both sides with a camouflage-coloured plastic material partly comprising polyethylene or any other polymer capable of exhibiting together with the reflecting metal layer a low emissivity and, in accordance with an important aspect of the invention, partly comprising a plastic material having a different emissivity. FIG. 3 shows schematically (and in enlarged scale for clarity) an example of a camouflage material to which the instant invention is applicable. This type of material is shown in detail in U.S. Pat. No. 4,529,633 issued July 16, 1985. This is a double-sided camouflage material having a polyethylene layer 1, a reflecting aluminum layer 2, a layer of glue 3, a fabric base or supporting layer 4, layer of glue 3', a reflecting metallic layer 2' and a layer of polyethylene 1'. In this camouflage material the respective sides outwardly from the fabric base are identical, but the layers 1 and 1' can have different colors in the optical spectral region. In accordance with the instant invention, however, and to provide a very useful measure of control of the thermal camouflage characteristics, the layer 1' is composed of a plastic material, for example, polyvinyl chloride, having an emissivity and transparency differing from that of the layer 1, which in this example may be polyethylene. In this instance, layers 2' and 3' may be eliminated as unnecessary because the polyvinyl chloride is not transparent to infrared. This provides a choice, making it possible to more closely simulate the thermal emission characteristics of a particular surrounding terrain by exposing one or the other of the two surfaces.

Figure 4:
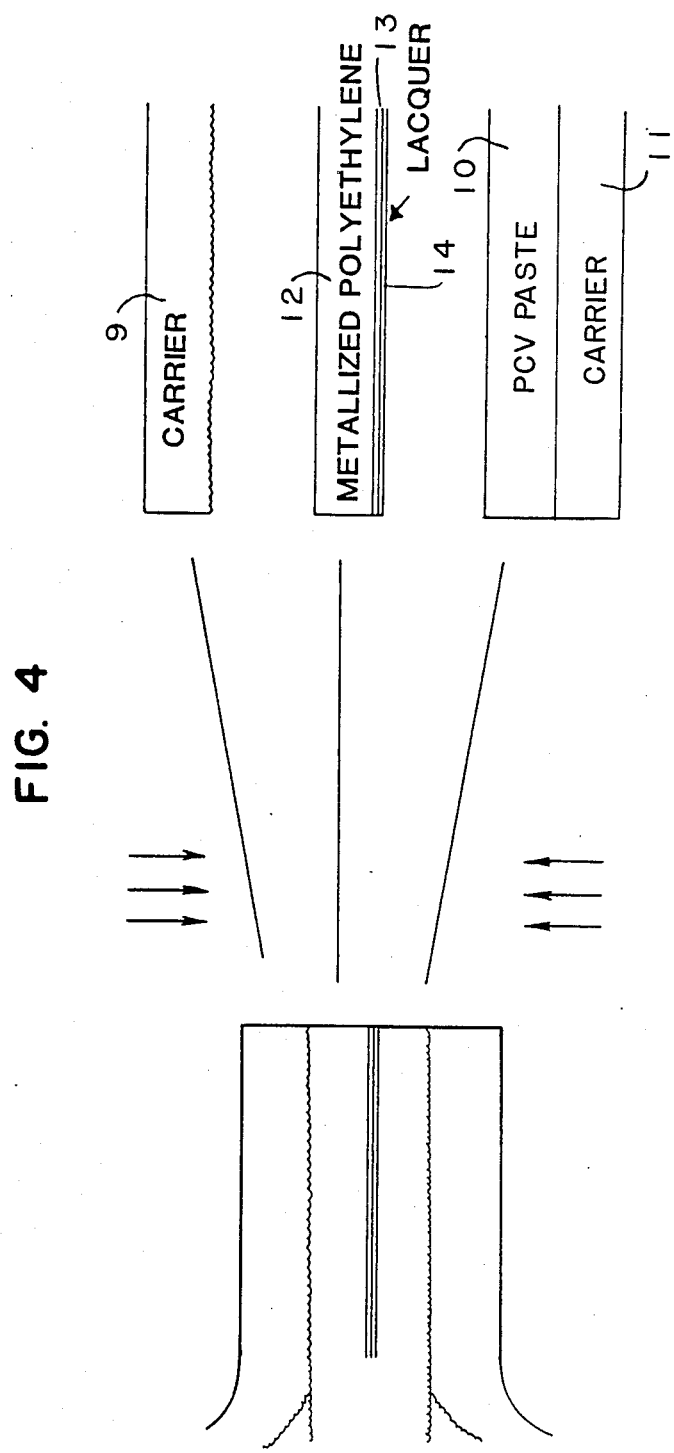
FIG. 4 illustrates another embodiment of the invention.

A method for making the camouflage material of the invention is diagrammatically illustrated in FIG. 4. The particular product has one surface of polyethylene and the other surface is polyvinyl chloride. Both exposed layers of the camouflage material are usually colored to provide visual and near IR camouflage and preferably are provided with matte surfaces or otherwise delustered to avoid specular reflection.

A master transfer release carrier 9 having the desired matte surface may be used. A layer 10 of polyvinyl chloride is also provided by applying a polyvinyl chloride plastisol to a second master transfer release carrier 11 and curing the polyvinyl chloride with heat. A film 12 of polyethylene, metalized on one surface and having the metal 13 coated with a lacquer 14 (which serves as a glue in the laminator) is also provided. The release carrier 9, metalized and lacquered polyethylene film 12 and polyvinyl chloride layer 10 with release carrier 11 may be provided in rolls. These materials are arranged as shown in FIG. 4 and fed into a laminating machine after which the release carriers 9 and 11 are drawn away from the respective surfaces of the resulting laminate.

The camouflage material may, of course, be manufactured in other manners. For example, the layers 10 through 14 may first be assembled, and then the outside surfaces may be embossed mechanically, as with rollers having surfaces configured to emboss a matte extension to the camouflage material. The method depicted in FIG. 4 is intended to be an exemplification only.

Another form of the invention is shown in an exaggerated cross-section in FIG. 5. Similar to the camouflage illustrated in FIG. 3, this camouflage may be identical on respective sides extending outwardly from a support or fabric base 15. Primed numerals are used for the layers beneath the fabric base 15 which correspond to the layers above. Layer 16 is a glue film used to adhere a metal layer 17 to the fabric base 15. A primer 18 is provided for adhering a plastic layer 19 to the metal layer 17.

The fabric base 15 may be a woven or non-woven synthetic fiber fabric which can include conductive elements or fibrils included in the fiber or spread and glued to the surface of the fabric in order to enhance the radar camouflaging properies of the camouflage. If a non-woven fabric is employed, the glue used to adhere the fibrils to the fabric surface may be a polyvinyl chloride latex, or polyurethane or acrylic dispersions. Alternatively the fabric base 15 may be replaced by a support layer which is not a "fabric" at all, but simply a layer or film of material which has sufficient dimensional stability to support the camouflage material. A fabric is preferred, but not mandatory.

The glue film 16 is employed only to secure the metal layer 17 to the fabric base 15. It is not intended to enhance or add to the camouflaging properties of the camouflage of FIG. 5, and need not be used if other means of securing the layer 17 to the layer 15 is used. The glue film 16 may be a single layer or a multitude of layers of an extruded film. Suitable materials for the glue film 16 include olefin copolymer blends, thermoplastic copolyesters, and ethylene vinyl acetate copolymer blends.

The metal layer 17 is employed, in combination with the plastic layer 19, to provide the thermal infrared camouflaging properties of the camouflage material of FIG. 5. The metal layer 17 may be applied in any one of many known methods, such as vacuum vapor deposition, and may, if radar properties are required, be crackled either mechanically or during application to the camouflage so that a high surface resistivity is created by forming surface discontinuities in the metal layer 17. Preferably, aluminum is used for the metal of the metal layer 17.

The primer 18 is used to adhere plastic of the plastic layer 19 to the metal layer 17. As shown in FIG. 5, the plastic layer 19 is preferably composed of a mosaic of plastics of different emissivities. Polyvinyl chloride (PVC) and polyethylene (PE) are illustrated. Polyvinyl chloride has a high emissivity of approximately 0.9, and is not transparent to thermal infrared. Polyethylene, on the other hand, is transparent to thermal infrared. Given a forty micron thick layer of plastic 19, pigmented polyethylene in combination with the metal layer 17 has an emissivity of about 0.4. If the outer surface of the layer 19 is, as preferred, matte, the combined emissivity is about 0.6. Increasing the thickness of the layer 19 to sixty microns increases the combined emissivity to about 0.8.

Since the polyethylene of the plastic layer 19 will readily adhere to the metal layer 17, the primer 18 is used primarily to assure that the polyvinyl chloride of the plastic layer 19 adheres to the metal layer 17. Although not limited, the primer 18 may consist of vinyl acetates, ethylacrylic-polymers, and titanates.

Because the primer 18 is necessary only to insure adherence of the polyvinyl chloride of the plastic layer 19 to the metal layer 17, it is preferred that the primer 18 is applied as spaced spots in a polkadot fashion rather than a continuous layer so that the polyethylene can adhere directly to the metal layer 17, while the polyvinyl chloride can be adhered to the metal layer 17 by means of the spots of primer 18. The plastic materials of the plastic coating 19 may be applied as polyvinyl chloride plastisols and polyethylene dispersions.

As shown in FIG. 5, adjacent portions of the plastic layer 19 need not alternate between plastics of two emissivity/transparency combinations. For example, the top layer of plastic 19 shows two areas of polyethylene contiguous to one another. The polyethylene of one may be pigmented to appear optically dark green while the polyethylene of the other may be pigmented to appear optically light green, and the polyvinyl chloride may be pigmented to appear tan. The pigmenting of the plastic materials of the plastic layer 19 will depend on the desired optical properties of the layer 19.

Also as shown in FIG. 5, the upper layer of plastic 19 and the lower layer of plastic 19' are offset from one another so that at times polyvinyl chloride of the upper layer 19 overlays polyethylene material of the lower layer 19', and vice versa. Depending on the desired characteristics of the camouflage, any sequence of registration of the upper layer 19 and the lower layer 19' may be incorporated into the camouflage material. Another example of configuration of the plastic layers 19 and 19' is shown in FIG. 6 regarding a further embodiment of the invention described immediately below, where the segments of the plastic material are directly over one another.

FIG. 6 shows another form of the invention substantially similar to the camouflage of FIG. 5 and with like layers bearing the same reference numerals. The only difference between FIGS. 5 and 6 is the incorporation of a metalized glue film 20 in place of the separate layers comprising the glue film 16 and metal layer 17. The metalized glue film 20 may be identical to the layers 16 and 17 of the camouflage of Figure 5, but rather than being applied as separate layers, a single metalized glue film layer 20 is applied directly to the fabric base 15. Also, as explained above, the orientation of the plastic materials of the plastic layers 19 and 19' may be in any fashion desired to provide the desired emissivities of the camouflage material and registration of the materials of the upper layer 19 in relation to the lower layer 19'.

As explained previously, polyvinyl chloride is essentially non-transparent to thermal infrared waves and alone has an emissivity of about 0.9. Hence, for thermal infrared purposes, the reflecting metal layer 17 or 17' or metal in the metalized glue film 20 or 20' is unnecessary beneath any portions of the camouflage material of FIGS. 5 and 6 where polyvinyl chloride is present, since no infrared waves are transmitted to the metal layer to be reflected. However, as a manufacturing expedient, the metal layer is normally applied as a continuous layer since the expense of omitting the metal layer where unnecessary for thermal infrared camouflage properties would be prohibitive. Also, since the metal layer 17 or 17' and metalized glue film 20 or 20' contribute to a radar camouflage, continuity of the crackled metal layers is often desirable.

The camouflage material of FIGS. 5 and 6 is double-sided; that is, either side of the camouflage on opposite sides of the fabric base 15 has identical layers. This permits leaf cutting of the camouflage material, or allows deployment of the camouflage material without regard to which side is visually exposed. This also permits one side to be pigmented differently from the other so that the camouflage material may serve as a visual and near IR camouflage under conditions of varying nature of the surroundings of any camouflaged object. When only a single-sided camouflage is necessary, it is clear that all layers on one side of the fabric base 15 may be omitted, and at times when dimensional stability is not critical, particularly when the camouflage material is to be applied to another support such as a net (FIGS. 7 and 8, described below), it may be possible to omit the fabric base 15 altogether.

FIG. 7 illustrates another form of the invention employing a series of hexagonal segments 21 of camouflage material which are secured to a base 22, such as a wide mesh net. The segments 21 may be glued, sewn, stapled or otherwise affixed to the net 22, and preferably, due to their hexagonal shape, are immediately adjoining one another. The structure of each of the segments 21 is in accordance with the disclosed camouflage materials of the invention. For example, the camouflage of FIGS. 3 and 4 may be cut into hexagonal segments and applied to the net 22. In all cases, the segments 21 are cut hexagonally and are placed on the net 22 such that a mosiac of emissivities is created. Leaf cutting of the segments 21 may be included as desired. Depending on the size of the segments 21, the plastic layer of each segment 21 may be different; that is, one segment 21 may have a solely polyethylene plastic layer, while an adjacent segment may have a solely polyvinyl chloride plastic layer. It should be evident that the various combinations are essentially infinite.

FIG. 8 is similar to FIG. 7, showing a series of segments 21' secured to the net 22. In this embodiment, however, the cutting of the segments 21' is irregular so that a regular pattern is not formed on the net 22. Typically the adjacent segments 21' overlap somewhat to assure proper camouflaging properties. The segments 21' are formed of the materials of the various camouflages exemplified above, as discussed in greater detail in connection with the segment 21 of FIG. 7.

The camouflage material need not be cut into segments as shown and described with regard to FIGS. 7 and 8. Alternatively, with reference to FIG. 9, a camouflage net 23 is composed of three panels 24 of continuous material joined together. Preferably, the panels 24 are made of the camouflage material described above in FIGS. 5 and 6, which are then leaf cut as at 25 and then attached to a supporting net 26. While a generally square camouflage net 23 is shown, it also can be rectangular, hexagonal, etc.

The camouflage material of FIGS. 5 and 6 can also be cut as described in U.S. Pat. No. 3,069,796 or similar punching methods. In such case, no supporting net need be used. Also, when an extremely light-weight camouflage is required, the layers 16', 17', 18' and 19' of FIG. 5 and 20', 18' and 19' of FIG. 6 can be omitted. The resulting camouflage is then used only as a single sided camouflage with only the layer 19 being visually exposed.

This invention provided a means for controlling the emissivity characteristics of camouflage material, making available camouflage means for more completely hiding objects of all kinds from thermal infrared surveillance. The described camouflage material may be used alone or with additional and enhancing camouflaging means. For example, the thermal camouflage material fully described in U.S. Pat. No. 4,529,633 may be employed along with the thermal camouflage material described herein to meet the exigencies of particularly difficult thermal camouflaging situations.

While the invention is especially directed to a novel approach to thermal camouflaging, it will be understood that it also encompasses camouflage dealing with visual, near IR and with radar broad band protection. The combination of the metallic surface in mosaic form and with the addition of conductive elements in the form of carbon or steel fibrils in the supporting web or otherwise incorporated in the camouflage material gives a broad band radar protection.

Various changes may be made to the invention without departing from the spirit thereof or scope of the following claims.

What is claimed is:

1. Camouflage material in a sheet form comprising a reflecting metal layer and a continuous layer of plastic overlying said metal layer, said layer of plastic comprising at least two different plastic materials having respectively different emissivities and transparencies, said plastic materials being situated in a side-by-side relationship with plastic materials of differing emissivities and transparencies adjacent one another such that a mosiac of diverse emissivities is created.

2. Camouflage material according to claim 1 including a supporting layer supporting said metal layer, said metal layer being secured to said supporting layer.

3. Camouflage material according to claim 2 in which said supporting layer comprises a fabric web, said metal layer being secured to said web.

4. Camouflage material according to claim 1 including a reinforced web supporting said metal layer, and including means for securing said metal layer to said web.

5. Camouflage material according to claim 4 in which said securing means comprises a glue film.

6. Camouflage material according to claim 1 in which said metal layer comprises a metalized glue film, and including a supporting layer supporting said metalized glue film.

7. Camouflage material according to claim 1 including means for adhering said plastic layer to said metal layer.

8. Camouflage material according to cliam 7 in which said adhering means comprises a primer, said primer having no substantial camouflage properties.

9. Camouflage material according to claim 8 in which said primer is applied as spaced spots on said metal layer.

10. Camouflage material according to claim 1 in which the surface of said plastic layer opposite to that facing said metal layer is delustered.

11. Camouflage material in a sheet form comprising a supporting layer, a reflecting metal layer applied to said supporting layer, means for securing said metal layer to said supporting layer, and a layer of plastic overlying said metal layer, said layer of plastic comprising at least two different plastic materials having respectively different emissivities and transparencies, said plastic materials being situated in a side-by-side relationship with plastic materials of differing emissivities and transparencies adjacent one another such that a mosaic of diverse emissivities is created.

12. Camouflage material according to claim 11 in which said securing means comprises a glue film.

13. Camouflage material according to claim 11 in which said metal layer comprises a metalized glue film, said glue film comprising said securing means.

14. Camouflage material according to claim 11 in which said supporting layer comprises a reinforced web.

15. Camouflage material in a sheet form comprising a supporting layer, a reflecting metal layer applied to each side of said supporting layer, means for securing said metl layers to said supporting layer, and a layer of plastic overlying each metal layer, said layer of plastic comprising at least two different plastic materials having respectively different emissivities and transparencies, said plastic materials being situated in a side-by-side relationship with plastic materials of differing emissivities and transparencies adjacent one another such that a mosaic of diverse emissivities is created.

16. Camouflage material according to claim 15 in which said metal layer comprises a metalized glue film, said glue film comprising said securing means.

17. Camouflage material according to claim 15 including means for adhering said plastic layers to said metal layers.

18. Camouflage material according to claim 17 in which said adhering means comprises a primer, said primer having no substantial camouflage properties.

19. Camouflage material according to claim 18 in which said primer is applied as spaced spots on said metal layer.

20. Camouflage material comprising a plurality of camouflage segments, a supporting net, and means securing said camouflage segments to said net, each camouflage segment comprising a reflecting metal layer and a layer of plastic overlying said metal layer, with the layers of plastic of said camouflage segments comprising at least two different plastic materials having respectively different emissivities and transparencies and with plastic materials of differing emissivities and transparencies adjacent one another such that a mosaic of diverse emissivities is created.

21. Camouflage material according to claim 20 including a supporting layer supporting said metal layer of each said segment, said metal layer being secured to said supporting layer.

22. Camouflage material according to claim 20 in which said metal layer of each segment comprises a metalized glue film, and including a supporting layer for each segment supporting said metalized glue film.

23. Camouflage material according to claim 20 in which each segment comprises an elongated panel, with a plurality of said panels being adjacent one another.

* * * * *